United States Patent
Ayandeh (10) Patent No.: US 10,367,681 B2
(45) Date of Patent: Jul. 30, 2019

(54) MAINTENANCE OF DATA FORWARDER CONNECTION STATE INFORMATION

(71) Applicant: Hewlett-Packard Development Company, L.P., Houston, TX (US)

(72) Inventor: Siamack Ayandeh, Littleton, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 461 days.

(21) Appl. No.: 14/777,501

(22) PCT Filed: Mar. 15, 2013

(86) PCT No.: PCT/US2013/032161
§ 371 (c)(1),
(2) Date: Sep. 15, 2015

(87) PCT Pub. No.: WO2014/142980
PCT Pub. Date: Sep. 18, 2014

(65) Prior Publication Data
US 2016/0050105 A1 Feb. 18, 2016

(51) Int. Cl.
*H04L 12/24* (2006.01)
*H04L 12/931* (2013.01)
*H04L 12/939* (2013.01)

(52) U.S. Cl.
CPC ...... *H04L 41/0668* (2013.01); *H04L 41/0873* (2013.01); *H04L 49/351* (2013.01); *H04L 49/357* (2013.01); *H04L 49/557* (2013.01)

(58) Field of Classification Search
None
See application file for complete search history.

(56) References Cited

U.S. PATENT DOCUMENTS

| 8,873,369 B2 | 10/2014 | Ayandeh |
| 2011/0176412 A1 | 7/2011 | Stine et al. |
| 2012/0106957 A1* | 5/2012 | Willeke ............ H04L 29/12207 398/58 |
| 2012/0155469 A1 | 6/2012 | Majumdar et al. |
| 2012/0177043 A1 | 7/2012 | Berman |
| 2012/0177044 A1 | 7/2012 | Berman |
| 2012/0230334 A1 | 9/2012 | Armstrong et al. |

(Continued)

OTHER PUBLICATIONS

Hewlett-Packard Development Company, L.P., "Converged Fabric for FCoE," PCT Application No. PCT/US2012/035745, Filed Apr. 30, 2012, pp. 1-26.

(Continued)

*Primary Examiner* — Jason E Mattis
*Assistant Examiner* — Hong Shao
(74) *Attorney, Agent, or Firm* — Rathe Lindenbaum LLP (57) ABSTRACT

An example of high availability for FC or FCoE can include maintaining connection state information in a Fiber Channel over Ethernet (FCoE) Data Forwarder (FDF) or Fiber Channel Data Forwarder (FcDF). A failure of a first FCoE Forwarder (FCF) associated with the FDF can be detected. A second FCF can check a configuration file of the second FCF to see if the second FCF is responsible for the FDF. The second FCF can request the virtual domain ID, of the failed FCF, from a principal switch. The second FCF can be used as a service node for the FDF.

10 Claims, 6 Drawing Sheets

(56) References Cited

U.S. PATENT DOCUMENTS

2012/0254554 A1* 10/2012 Nakajima ............. G06F 3/0607
711/154
2012/0275339 A1* 11/2012 Xiong ................... H04L 49/357
370/254

OTHER PUBLICATIONS

Hewlett-Packard Development Company, L.P.., "Inter Domain Link for Fibre Channel," PCT Application No. PCT/US2012/034995, Filed Apr. 25, 2012, pp. 1-34.
International Search Report and Written Opinion, International Application No. PCT/US2013/032161, dated Dec. 26, 2013, pp. 1-10.

* cited by examiner

TABLE X - ASSIGNED FDF N_PORT_ID RANGE NOTIFICATION
(A_FNRN)

| ITEM | SIZE (BYTES) |
|---|---|
| 531 — SW_ILS CODE = NEW | 4 |
| 533 — ORIGINATING c/FCF SWITCH_NAME | 8 |
| 535 — DESTINATION FDF SWITCH_NAME | 8 |
| 537 — NUMBER OF N_PORT_ID RANGES (q) | 4 |
| 539 — N_PORT_ID RANGE #1 | 4 |
| 541 — N_PORT_ID RANGE #2 | 4 |
|  |  |
| 543 — N_PORT_ID RANGE #q | 4 |

Fig. 5

TABLE X - VNRN REQUEST PAYLOAD

| ITEM | SIZE (BYTES) |
|---|---|
| 645 — SW_ILS CODE = XX00 0001h | 4 |
| 647 — ORIGINATING FCDF SWITCH_NAME | 8 |
| 649 — DESTINATION CONTROLLING SWITCH SWITCH_NAME | 8 |
| 651 — F_PORT_NAME | 8 |
| 653 — PHYSICAL PORT NUMBER | 4 |
| 655 — FLOGI/NPIV FDISC PARAMETERS | 116 |
| 657 — ASSIGNED FC ID | 4 |

MAINTENANCE OF DATA FORWARDER CONNECTION STATE INFORMATION

BACKGROUND

Computing networks can include multiple network devices including network devices such as routers, switches, hubs, and computing devices such as servers, desktop PCs, laptops, workstations, mobile devices and peripheral devices, e.g., printers, facsimile devices, and scanners, networked together across wired and/or wireless local and/or wide area network (LANs/WANs).

High Availability (HA) is a mode of operation for networks where redundant components are used to reduce service outage. The cost of high availability in FC/FCoE networks, measured in terms of the number of nodes, increases linearly with the number of switches in an HA cluster. Current HA solutions maintain a per connection state within a primary Fiber Channel over Ethernet (FCoE) Forwarder (FCF) which is synchronized across a switch HA cluster to a secondary FCF. The model of operational control is active (primary)/standby (secondary) where all connection and fabric services intelligence is placed in the primary FCF (p/FCF) and synchronized with the secondary FCF (s/FCF). A primary/secondary FCF together with a set of FDF(s) define a virtual domain (or switch). Synchronization of connection state from a p/FCF to an s/FCF can lead to a number of issues.

DETAILED DESCRIPTION

Embodiments of the present disclosure may include network devices, systems, and methods, including executable instructions and/or logic thereon for high availability for Fiber Channel over Ethernet (FCoE). One network device example includes a processing resource coupled to a memory. The memory includes computer readable instructions, e.g., program instructions, executed by the processing resource to maintain a connection state in a FCoE data forwarder (FDF). One example of program instructions can be executed to provide fabric services, by a FCoE forwarder (FCF), to an FDF. If a failure of a controlling FCF (c/FCF) occurs, an additional FCF can check a configuration file to determine if the additional FCF is responsible for the FDF of the failed c/FCF.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure. As used herein, the designators "K," "N," "M," "W", "q", etc., particularly with respect to reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 FIG. 2 and/or 302 in FIG. 3. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
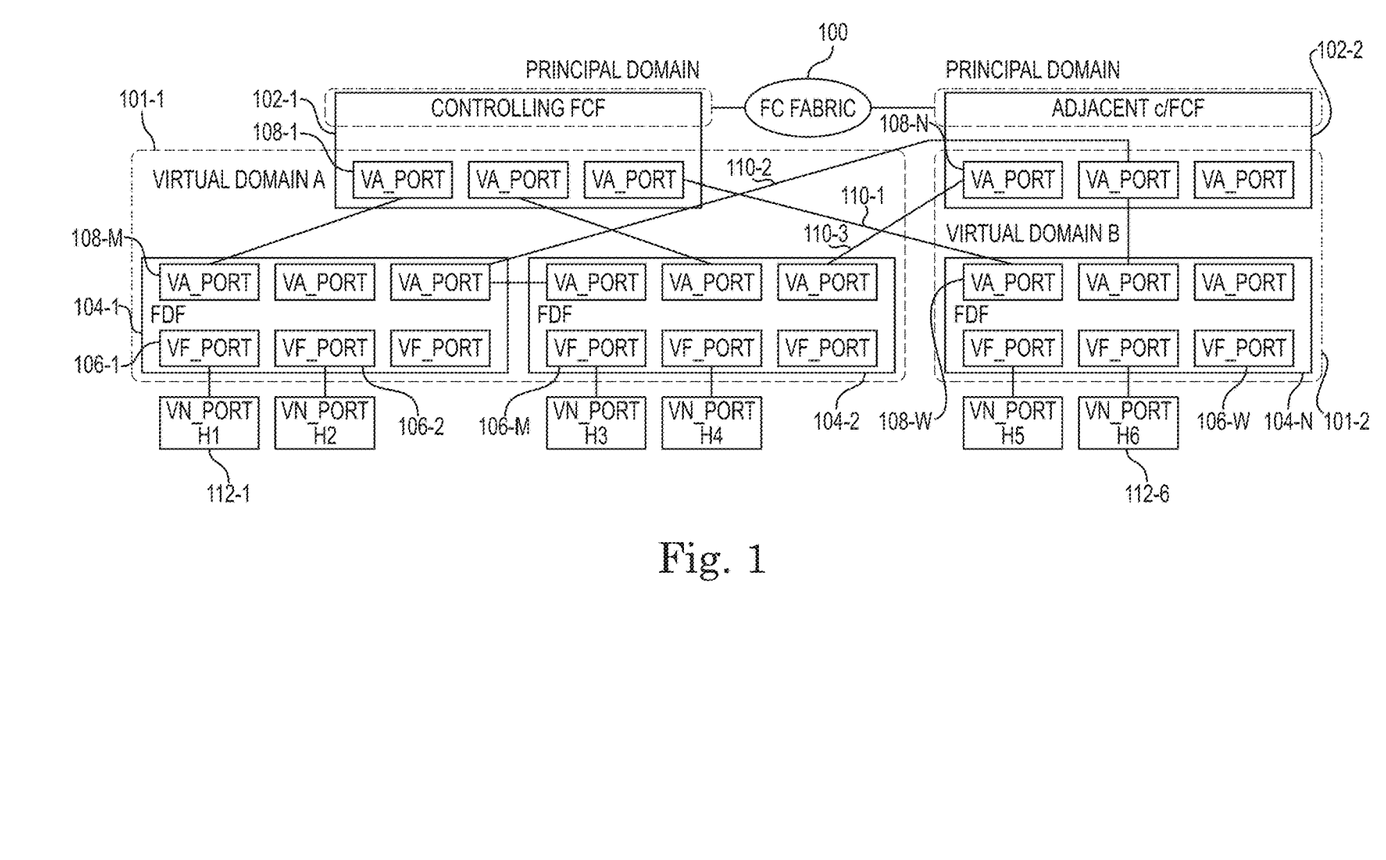
FIG. 1 illustrates an example of a number of virtual domains, e.g., virtual domain A and virtual domain B, among various nodes as part of a FCoE switching fabric in a network according to the present disclosure.

FIG. 1 illustrates an example of a number of virtual domains, e.g., virtual domain A (101-1) and virtual domain B (101-2), among various nodes as part of a FC switching fabric 100 between switches in a network according to an embodiment of the present invention. Virtual domain A (101-1) with addition of the adjacent FCF 102-2 can be referred to as a high availability (HA) cluster. A virtual domain is defined by an FCF set and an FDF set by configuration. One of the FCF(s), e.g. 102-1 is the controlling FCF and the others adjacent FCF(s). The virtual domains, 101-1 and 101-2, can form part of a storage area network (SAN) switching fabric (SAN fabric) 100. A SAN Fabric 100 is a collection of fiber channel (FC) switches and/or fiber channel over Ethernet (FCoE) forwarders (FCF) which share a fiber channel fabric mapping (FCF_MAP) and run fabric protocols over their "E" ports (E_Ports) and/or virtual E_Ports (VE_Ports). E_Ports are a type of port for connecting switches. The FCF_MAP is a unique identifier for the SAN Fabric 100. While switches and switching fabric are used in the example of FIG. 1, embodiments are not limited to switches and switching fabric for network devices. Further, while only two virtual domains 101-1 and 101-2 are shown, embodiments are not limited to two virtual domains. A virtual component, e.g., port, or connection, e.g., link, is a logical connection versus an express physical connection.

As shown in FIG. 1, the nodes in a SAN Fabric can include a controlling FCF node (c/FCF) 102-1 and an adjacent FCF node (a/FCF) 102-2 each having their own principal domain identifier. The virtual domain can further include a number of FDFs, e.g., 104-1, 104-2, ... , 104-N, associated with an c/FCF node, e.g., 102-1 and 102-2, in each virtual domain of the SAN Fabric.

For native FC the FCF node is referred to as FCCF and the FDF node is referred to as FcDF. The embodiment can apply to both FC and FCoE networks. An FDF can be a top of rack ToR switch and an FCF can be an aggregation end of row EoR switch or director class switch as it is called in FC parlance. FCFs are nodes within a network or in FC terms a so called fabric. As shown in FIG. 1, controlling FCF (c/FCF) 102-1 and adjacent FCF (a/FCF) 102-2 as well as virtual domain A 101-1 and virtual domain B 101-2 together with the FC-fabric 100 form the fabric. FDFs are only visible within a virtual domain or distributed switch. Nodes are connected with links to form the SAN or "fabric". Links connect ports which are of various types N, F, A, E, etc., and described more below. A fabric is a collection of switches which share a database and a so termed FC_MAP.

Each FDF, 104-1, 104-2, . . . , 104-N, includes a number of "F" ports (F_Ports) and/or virtual F_Ports (VF_Ports), e.g., 106-1, 106-2, . . . , 106-M, . . . , 106-W. F_Ports are a type of port terminating at a switch and can connect the SAN fabric to "N" ports (N-Ports) and/or virtual N_Ports (VN_Ports) on a number of host devices in a network. N_Ports are a type of port designation on a host device for connecting to switches.

As shown in FIG. 1, each FCF node 101-1 and 101-2 and each FDF node 104-1 and 104-2 is additionally provided with a number of "A" port (A_Ports) and/or virtual A_Ports (VA_Ports), e.g., 108-1, 108-2, . . . , 108-M, . . . , 108-W. An A_Port is a type of port, consisting of hardware, e.g., logic in the form of an application specific integrated circuit (ASIC), provided to the FCF nodes 101-1 and 101-2 and the FDF nodes 104-1 and 104-2. A_Ports allow FCF to FDF and FDF to FDF node connectivity within a distributed switch and virtual domain. That is, the A_Ports and/or VA_Ports in the FCF nodes 101-1 and 101-2 and the FDF nodes 104-1 and 104-2 allows for the creation of VA_Port virtual links, e.g., inter domain VA_Port virtual links 110-1, 110-2, 110-3, for forwarding between an FDF and an adjacent controlling FCF.

An adjacent FCF, e.g., 102-2, can be a controlling FCF in another virtual domain, e.g. virtual domain B (101-2), and can serve as an adjacent FCF for another virtual domain, e.g. virtual domain A (101-1), to which FDFs, e.g., 104-1 and 104-2, each have VA_Port virtual links. An FCF set can include a c/FCF and a plurality of a/FCFs that, while forwarding traffic for that virtual domain, can standby for the c/FCF. Any a/FCF can take over services offered by a failed c/FCF to an FDF if the a/FCF is in the same FCF set as the c/FCF. In some embodiments, the standby switch may be "active", e.g., handling packet and frame connections, or inactive. Embodiments are not so limited.

Allowing for inter domain VA_Port virtual links 110-1, 110-2, and 110-3 involves the addition of an adjacent FCF (e.g., 108-N), set. Program instructions are executed to allow an FCF to setup VA_Port virtual links to the list of FDFs using FIP ELP (FCoE Initialization Protocol (FIP) exchange link parameters (ELP)), e.g., allow ELP with C=D=0 or add an additional bit) indicating that FCF is an adjacent FCF. A subset of fiber channel data forwarder (FcDF) protocol, including FcDF reachability notifications (FDRN), e.g. virtual N_Port reachability notification (VN-RNs) and FcDF unreachability notifications (FDUN), e.g. virtual N_Port unreachability notifications (VNUNs), are re-used, and a new protocol, VA_Port switch internal link service (SW_ILS), is added. The SW_ILS are control frames sent back and forth between the FCF and FDF nodes. An example of this mechanism is described in PCT application no. PCT/US2012/034995 filed Apr. 25, 2012.

Embodiments of the present disclosure do away with switch state synchronization between c/FCFs and a/FCFs. By maintaining connection state information in an FDF, or FcDF as the case may be, an FCF can become a service node providing control plane and fabric services to a group of FDF(s).

According to embodiments, described further below, program instructions, as stored in a fiber channel control stack and executable by a processing resource (e.g., within a control plane of a given switch), can execute instructions to monitor and detect if a failure of a switch (c/FCF) of an FDF has occurred. According to embodiments described herein, the program instructions, e.g. control plane instructions of an FCF, can execute to check a configuration file to determine if the FCF is a responsible FCF of the FDF whose c/FCF failed. In this way, state synchronization between a c/FCF and an a/FCF can be avoided and 1:1 redundant FCFs maintaining the same connection state information is no longer necessary.

In this manner, any one of the adjacent FCF(s) in the virtual domain FCF set can replace a failed controlling FCF. According to embodiments, as described more below, the program instructions execute such that no connection state synchronization is required. An a/FCF that is responsible for the FDF can request that the a/FCF become the new controlling FCF (c/FCF) of the impacted FDF, This is accomplished by sending an RDI to the principal switch requesting the virtual domain-ID for the domain for which the c/FCF has failed. Only one of the requesting a/FCF(s) will be granted the virtual domain-ID. As mentioned above, the cost of HA in FC is currently measured in terms of the number of FCFs and increases linearly with the number of switches in a HA cluster "N". Our model may reduce the cost structure to (1/N−1), where N is the number of switches in the HA cluster (captured in the virtual domain FCF set).

Figure 2:
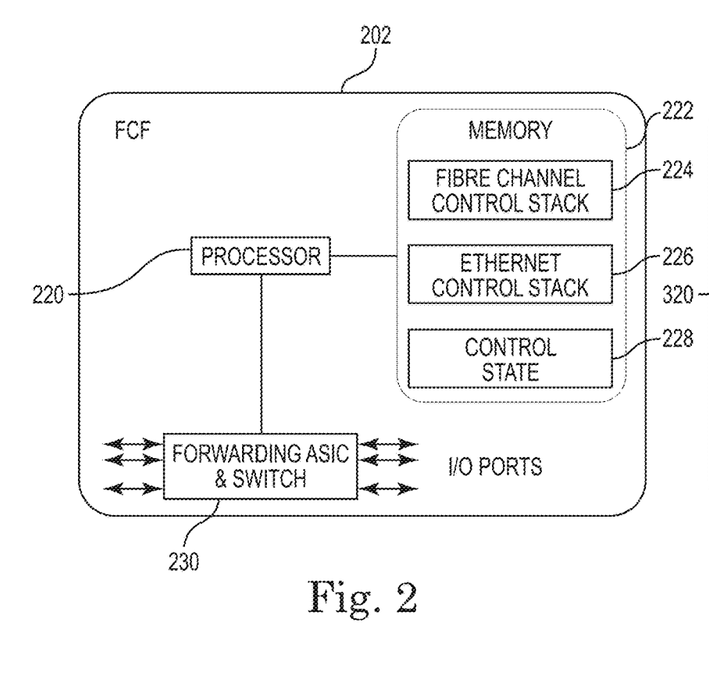
FIG. 2 illustrates an example of an FCoE forwarder (FCF) node according to the present disclosure.

FIG. 2 illustrates an example of an FCoE forwarder (FCF) node according to an embodiment of the present invention. As shown in the embodiment of FIG. 2, an FCF node, e.g. as part of a virtual switch, can include a processor 220, e.g. processing resource couple to a memory 222. As shown in the embodiment of FIG. 2, an FCF node can include access to a memory 222 associated with the FCF node 202. The memory 222 may include a fiber channel control stack 224, e.g., control plane software (computer executable instructions or program instructions). The program instructions may be executed to perform acts in connection with the embodiments of the present invention, as described in connection with FIG. 7. The memory 222 associated with an FCF node 202 may further include an Ethernet control stack 226, and a control state 228, including instructions executable to track and monitor a connection state of a given host, e.g., host 112-1, . . . , 112-6 in FIG. 1. According to embodiments of the present invention, program instructions associated with the FCF 202 control stack 224 are executed by the processing resource 220 such that if a failure of a switch, i.e., FCF, is detected, an alternate path through an adjacent FCF can be established without having to maintain synchronized connection state information across a c/FCF and a redundant a/FCF.

As shown in FIG. 2, the processing resource 220 can execute instructions received from the memory 222 to implement embodiments of the acts of the present invention. That is, in at least one embodiment, the processing resource 220 executes instructions to perform the acts described herein, directing hardware (e.g., an ASIC) such as forwarding switch 230 to receive and to send, e.g., to route packets, through an A_Port and/or A_Port Virtual Link (VA_Port Virtual Link), e.g., 110-1, 110-2, or 110-3, in FIG. 1, to and from input and output (I/O) ports. According to embodiments of the present invention, program instructions, associated with the FCF, are executed to use the control state information 228 in memory 222, such that if a failure of a switch (FCF) is detected, an a/FCF can resume the functions of the failed c/FCF, without having to maintain synchronized connection state information between a c/FCF and a redundant a/FCF in a high availability (HA) cluster.

Figure 3:
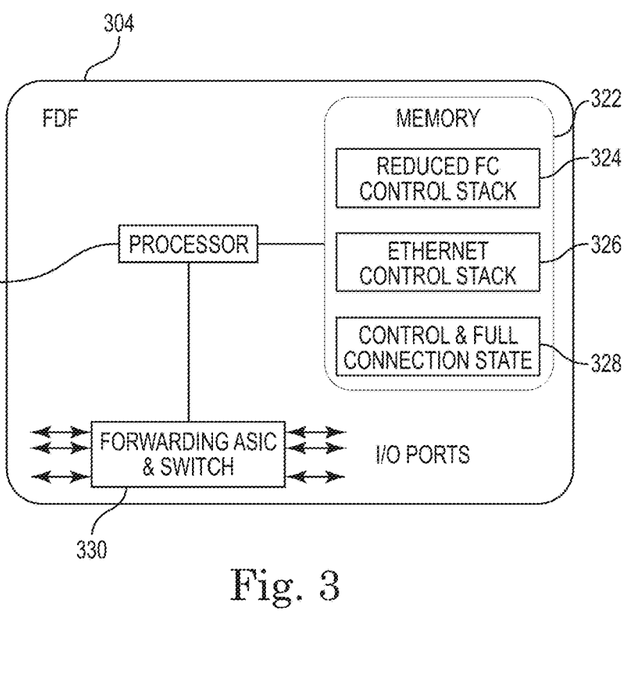
FIG. 3 illustrates an example of an FCoE data forwarder (FDF) node according to the present disclosure.

FIG. 3 illustrates an example of an FCoE data forwarder (FDF) node 304 according to an embodiment of the present invention. As shown in the embodiment of FIG. 3, an FDF node, e.g. as part of a virtual switch, can include a processor 320, e.g. processing resource coupled to a memory 322. As shown in the embodiment of FIG. 3, an FDF node can include access to a memory 322 associated with the FDF node 302 and may include a "reduced" fiber channel control stack 324, e.g., control plane software (computer executable instructions (CEI)) relative to an FCF node. The CEI may be executed to perform acts in connection with the embodiments of the present invention, as described in connection with FIG. 7. The memory 322 associated with an FDF node 304 may further include an Ethernet control stack 326, and full connection state 328, including instructions executable to track and monitor a full connection state of a given host, e.g., host 112-1, . . . , 112-6 in FIG. 1. According to embodiments of the present invention, program instructions associated with the FDF, reduced FC control stack, are executed such that an alternate path through an adjacent FCF is established without having to maintain synchronized between the a/FCF and failed c/FCF in a high availability (HA) cluster. The VA_Port links to a/FCF(s) are used for forwarding during normal operation. After an adjacent FCF becomes the new c/FCF, these links are also used for additional control plane functions, such as route table updates etc.

As shown in FIG. 3, the processing resource 320 can execute instructions received from the reduced FC control stack 324 in the memory 322 to implement embodiments of the present invention. That is, in at least one embodiment, the processing resource 320 executes instructions to perform the acts described herein, directing hardware 330 (e.g., an ASIC) such as a forwarding switch 330 to receive and to send, e.g., to route packets, through an A_Port and/or A_Port Virtual Link, e.g., 110-1, 110-2, and/or 110-3 in FIG. 1, to and from input and output (I/O) ports as shown in FIG. 3.

Figure 4:
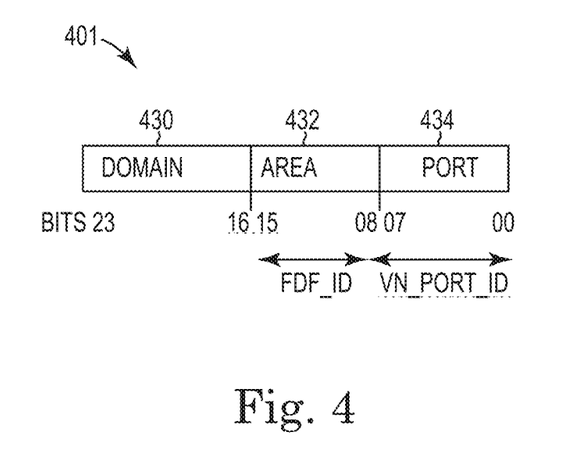
FIG. 4 illustrates an example of an FC identifier according to the present disclosure.

FIG. 4 illustrates an example of a fiber channel (FC) identifier 401 according to the present disclosure. The FC identifier can identify a domain (e.g., domain identification (DID)) 430, an FDF identification area (e.g., FDF ID) 432, and a port identification (e.g., VN_Port ID) 434. In one example, the least 16 bits of the FC identifier (e.g., the FDF ID and VN_Port ID portion of the FC identifier) can be allocated to subtending FDFs and the FDFs' subtending VN_Ports. Allocation of the bits in an address space to the FDFs and VN_Ports can be according to implementation and protocols support a flexible allocation. For example, an FC ID of 2.1.1 may refer to a domain_ID of 2, an FDF_ID of 1, and VN_Port ID 1 on a device attached to an FDF.

Figure 5:
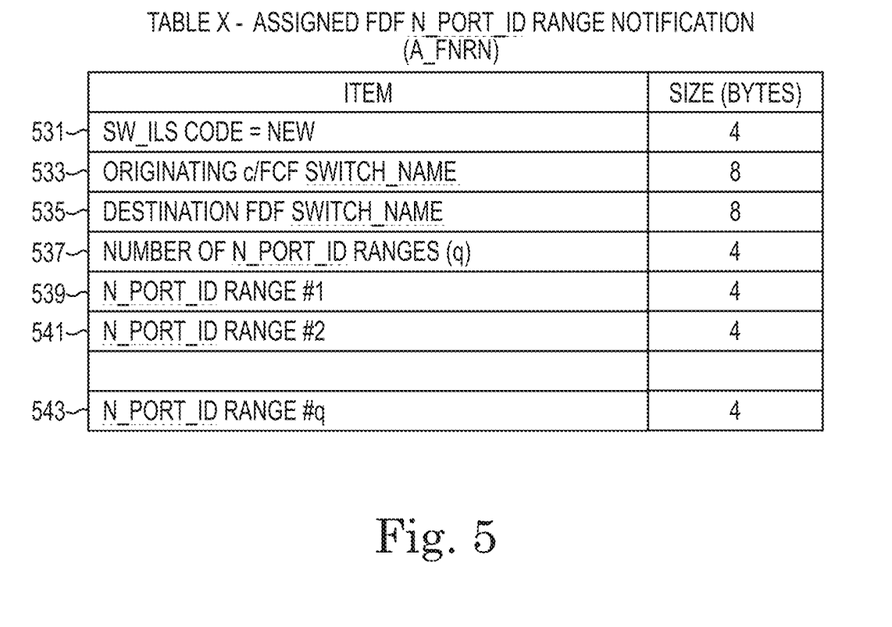
FIG. 5 illustrates an example of a table for an assigned FDF N_Port_ID range notification (A_FNRN) according to the present disclosure.

FIG. 5 illustrates an example of a switch ILS data format for an assigned FDF N_Port_ID range notification (A_FNRN) according to the present disclosure. The A_FNRN table can be a communication from the c/FCF over a VA_Port virtual link. As shown in FIG. 5, the A_FNRN table can include a new Switch Internal Link Service (SW_ILS) code 531, an originating c/FCF Switch_Name 533, a destination FDF Switch Switch Name 535, a number of N_Port_ID ranges (q) 537, an N_Port_ID range #1 539, an N_Port_ID range #2 541, and an N_Port_ID range #q 543. An SW_ILS are control frames sent back and forth by virtue of the previously described A_Ports, VA_Ports and VA_Port Virtual links above. A new switch ILS can assign one or more ID range(s) to an FDF using the A_FNRN table in FIG. 5.

The FDRN SW_ILS can be sent by the FDFs periodically to the c/FCF and includes a list of a/FCFs to which they have VA_Port virtual link or A_Port link connectivity. Hence, in this mechanism, if a c/FCF node fails the FDFs in that virtual domain can continue to forward traffic through the a/FCF(s).

Figure 6:
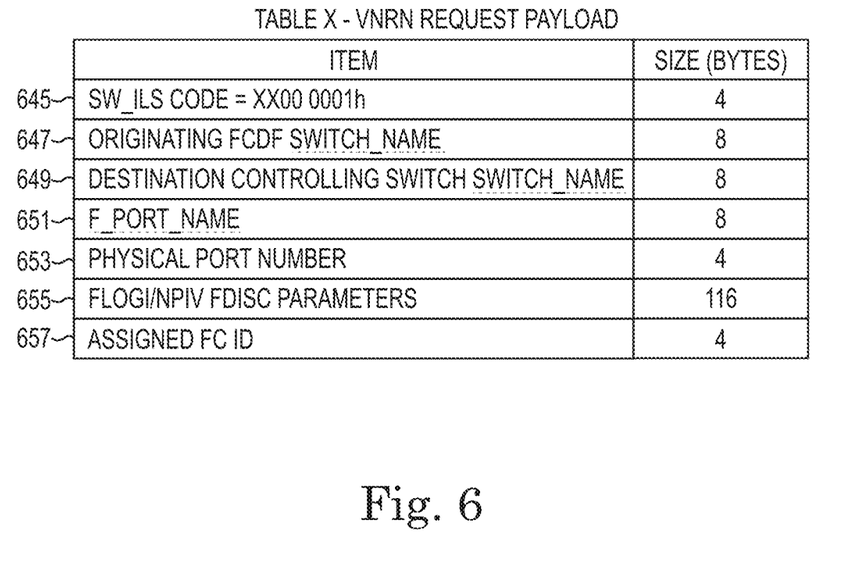
FIG. 6 illustrates an example of a table for a virtual N_Port reachability notification (VNRN) request payload according to the present disclosure.

FIG. 6 illustrates an example of a SWS-ILS data format for a virtual N_Port reachability notification (VNRN) request payload according to the present disclosure. The VNRN request payload of FIG. 6 can include an SW_ILS Code 645, an originating FcDF Switch_Name 647, a destination controlling switch switch_name 649, an F_Port_Name 651, a physical port number 653, fiber channel initialization protocol (FIP) login (FLOGI)/N_Port Packet ID Virtualization (NPIV) FCF Discovery (FDISC) parameters 655, and an assigned FC ID 657.

In one embodiment, the F_Port controller address that is well-known (i.e., FFFFFEh) resides within an FDF as well as the associated c/FCF. A switch ILS VNRN can be used to inform a c/FCF of a new login. The ILS can be augmented with an assigned FC ID 657 (the range of available FC ID(s) which had been previously assigned by the c/FCFas part of the FLOGI process. The c/FCF can act as a proxy and can register a FLOGI on behalf of the FDF with a storage area network (SAN) fabric principal switch. The c/FCF can provide a plurality of fabric services on behalf of the FDF. Fabric services can include zoning enforcement setup among other services described below.

When a switch fabric setup for a new login session is complete (e.g., zoning filters in place), a c/FCF can send a VNRN switch acceptance (SW_ACC) reply to the FDF. The VNRN SW_ACC can indicate acceptance of a VNRN request sequence for processing. The FDF can then respond to a VN_Port FLOGI with an acceptance (e.g., FLOGI LS_ACCEPT). The FDF is also responsible for sending (FIP) Keep_Alives for a connection established. The previous approaches had a c/FCF responsible for sending such FIP Keep_Alives.

Figure 7:
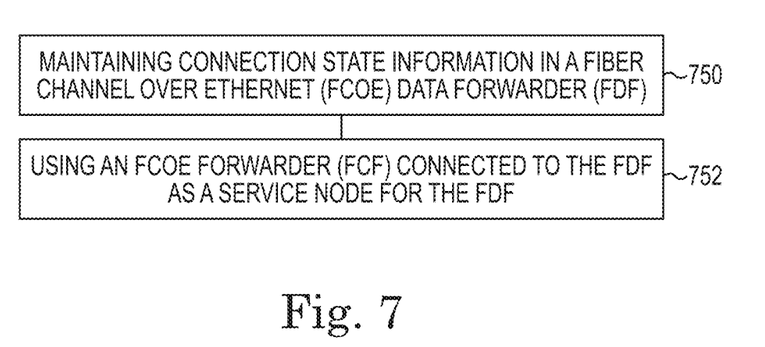
FIG. 7 illustrates an example of a flow diagram according to the present disclosure.

FIG. 7 illustrates an example of a flow diagram according to the present disclosure. At block 750, the flow diagram can include maintaining connection state information in an FDF, or FcDF. Since connection state information is no longer maintained in an FCF, connection state information is no longer synchronized between a c/FCF and a redundant a/FCF.

If a c/FCF of a virtual domain fails, an a/FCF can detect this failure of the c/FCF associated with the FDF(s) in the virtual domain. The a/FCF can detect the failure of the c/FCF by using FC shortest path first (FSPF) routing protocol. In this example, if a switch or FCF node fails and is out of service, the FSPF can broadcast this information to all FCF nodes within the SAN fabric, e.g., Fabric 100 in FIG. 1. The failed c/FCF node can be removed from the network graph and its principal domain_ID and virtual domain-ID can become available for reallocation.

The following procedure can recover a failed virtual domain (or switch) operation. An a/FCF can detect a failure of a c/FCF through FSPF advertisements. The a/FCF can have routing entries for an affected FDF, i.e., the virtual domain whose c/FCF failed, in the FCF's forwarding tables. The a/FCF can request the same domain_ID of the virtual domain and associated FDF(s) from a principal switch using an RDI (request domain_ID). A plurality of FCFs in the set of adjacent FCFs of the virtual domain can request the same domain_ID. The principal switch will grant the domain_ID (e.g., 430 in FIG. 4) to one, usually the first, requesting FCF and deny any remaining requests for allocation of the failed virtual domain_ID.

The a/FCF that was allocated the domain_ID by the principal switch can now replace the failed c/FCF and becomes the new c/FCF for the set of subtending FDF(s) for the given domain_ID and its subtending connections. The new c/FCF can advertise the acquired domain_ID to the rest of the native fabric using FSPF. The new c/FCF, as well as other a/FCF(s) in the virtual domain have granular forwarding table entries for the acquired domain_ID to the affected FDF(s) as the previous failed c/FCF did before per PCT application no. PCT/US2012/034995 filed Apr. 25, 2012. An FDF can use its portion of the assigned address space to assign VN_Port identifiers to the newly logged in sessions from VN_Ports. The assigned address ranges are allocated to the FDF using an A_FNRN table as shown in FIG. 5. An FDF can be assigned multiple ID ranges (e.g., 539 and 541 of FIG. 5).

At block 752, the flow diagram can include using an FCF connected to the FDF as a service node for the FDF. The FCF can act as a service node to provide control plane functions and/or fabric services. Fabric services can include obtaining a domain ID (e.g., domain_ID 430 in FIG. 4) for a virtual domain from a fabric principal switch to allocate a portion of an FC identifier address space (e.g., see FIG. 4) to each FDF in the virtual domain. Fabric services can include providing forwarding table data to the FDF, wherein the forwarding table data comprises internal routes of the virtual domain. The forwarding table data can include internal routes of the virtual domain which are based on a reported set of VA_Port links known as A_Port Switch Links (ASL). Fabric services can include registering a FLOGI with a storage area network (SAN) fabric for an FDF. Fabric services can include obtaining zoning information. A c/FCF can act as a proxy on behalf of an FDF which sent a FLOGI and obtain zoning information from a fabric controller. The fabric controller can reside on a principal switch. The c/FCF can apply zoning filters on behalf of the FDF that sends the FLOGI.

In an example embodiment of FIG. 7, program instructions, associated with the a/FCF, can be executed by the processing resource (e.g., 220 in FIG. 2) to reclaim the virtual domain_ID of the failed c/FCF from the principal switch in the SAN fabric. Further, in the example embodiment of FIG. 7, program instructions, associated with the a/FCF, are executed by the processing resource to establish VA_Port virtual links, if not in place, with the FDFs of the virtual domain of the failed FCF.

According to at least one example embodiment of FIG. 7, program instructions, associated with the a/FCF, are executed by the processing resource (e.g., 220 in FIG. 2) to perform VA_Port protocol functions already described Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

The term "a number of" is meant to be understood as including at least one but not limited to one.

What is claimed:

1. A method, comprising:
    maintaining connection state information in a fiber channel (FC) over Ethernet (FCoE) Data Forwarder (FDF) or Fiber Channel Data Forwarder (FcDF);
    using an FC forwarder (FCCF) or FCoE Forwarder (FCF) connected to the FDF as a service node for the FDF or FcDF; and
    providing a secondary adjacent FC forwarder (FCCF) or FCoE Forwarder (FCF) connected to the FDF as a backup service node for the FDF or FcDF upon failure of the FC forwarder (FCCF) or FCoE Forwarder (FCF), wherein changes in the connection state information are not synchronized between (a) the FC forwarder (FCCF) or FCoE Forwarder (FCF) and the (b) secondary adjacent FC forwarder (FCCF) or FCoE Forwarder (FCF).

2. The method of claim 1, comprising providing a control plane to the FDF or FcDF by using a FCF or FCCF as a service node.

3. The method of claim 1, comprising providing a fabric service to the FDF or or the FcDF.

4. The method of claim 1, comprising detecting a failure of an FCF or an FCCF using Fiber Channel Shortest Path First (FSPF).

5. The method of claim 1, comprising checking a configuration file, by an adjacent FCF (a/FCF), to determine if the a/FCF is responsible for a failed FCF.

6. The method of claim 1, comprising:
    sending, by the FCF, assigned FDF N_Port_ID range notification (A_FNRN) switch interlink service (SW_ILS) information to the FDF; and
    receiving, at the FCF, Virtual_N_Port Reachability Notification (VNRN) request SW_ILS information from the FDF.

7. A non-transitory computer-readable medium storing program instructions executable by a processing resource to:
    maintain connection state information in a Fiber Channel (FC) over Ethernet (FCoE) Data Forwarder (FDF) or fiber channel data forwarder (FcDF);
    detect a failure of a first FCoE Forwarder (FCF) or a first FC Forwarder (FCCF) associated with the FDF or FcDF;
    check a configuration file of a second FCF or a second FCCF to see if the second FCF or the second FCCF is responsible for the FDF or the FcDF;
    request a virtual domain ID previously owned by the failed first FCF or the failed first FCCF from a principal switch;
    receive the virtual domain ID at the second FCF or the second FCCF; and
    use the second FCF or the second FCCF as a service node for the FDF or the FcDF, wherein the failure of the first FCF or the first FCCF is detected using FSPF, wherein changes in the connection state information are not synchronized between the first FCoE Forwarder (FCF) or the first FC Forwarder (FCCF) associated with the FDF or FcDF and the second FCF or the second FCCF prior to the failure of either the first FCoE Forwarder (FCF) or the first FC Forwarder (FCCF) associated with the FDF or FcDF and the second FCF or the second FCCF.

8. The medium of claim 7, wherein the second FCF or the second FCCF is used as a service node to provide control plane functions comprising address range allocation and forwarding table updates.

9. The medium of claim 7, wherein the second FCF or the second FCCF is used as a service node to apply zoning filters from a fabric controller for a host that sends a FLOGI.

10. A network device, comprising:
a processing resource; and
a memory, the memory having program instructions executed by the processing resource to:
maintain connection state information in a fiber channel (FC) over Ethernet (FCoE) Data Forwarder (FDF) or FC data forwarder (FcDF); and
provide, by a FCoE Forwarder (FCF) or FC Forwarder (FCCF), fabric services to the FDF or FcDF, wherein the fabric services comprise:
obtain a domain ID for a virtual domain from a fabric principal switch to allocate a portion of a Fiber Channel (FC) identifier address space to each FDF or FcDF in the virtual domain;
provide forwarding table data to the FDF or FcDF, wherein the forwarding table data comprises internal routes of the virtual domain;
register a FLOGI with a storage area network (SAN) fabric for the FDF or FcDF; and
apply zoning filters,
wherein the FCF or the FCCF detects a failure of a controlling FCF (c/FCF) or a controlling FCCF (c/FCCF) of the FDF or the FcDF before providing a fabric service to the FDF or the FcDF,
wherein before providing a fabric service to the FDF or the FcDF, an FCF or FCCF checks a configuration file to determine if the FCF or the FCCF is responsible for the FDF or the FcDF of the failed c/FCF or the failed c/FCCF,
wherein if the FCF or the FCCF is responsible for the FDF or the FcDF, the FCF or the FCCF requests the virtual domain ID previously owned by the failed c/FCF or the failed c/FCCF from a principal switch,
wherein if the FCF or the FCCF obtains the virtual domain ID previously owned by the failed c/FCF or the failed c/FCCF from the principal switch, the FCF or the FCCF becomes a new c/FCF or a new c/FCCF of the FDF or FcDF,
wherein changes in the connection state information is not synchronized between (a) the FCoE Forwarder (FCF) or the FC Forwarder (FCCF) associated with the FDF or FcDF and (b) the controlling FCF or the controlling FCCF prior to failure of either of the FCoE Forwarder (FCF) or the FC Forwarder (FCCF) associated with the FDF or FcDF and the controlling FCF or the controlling FCCF.

* * * * *